United States Patent [19]
Anderson

[11] Patent Number: 5,375,081
[45] Date of Patent: Dec. 20, 1994

[54] HIGH SPEED ADDER USING A VARIED CARRY SCHEME AND RELATED METHOD

[75] Inventor: Donald C. Anderson, Austin, Tex.

[73] Assignee: Motorola, Inc., Schaumburg, Ill.

[21] Appl. No.: 206,288

[22] Filed: Mar. 7, 1994

Related U.S. Application Data

[63] Continuation of Ser. No. 949,413, Sep. 22, 1992, abandoned.

[51] Int. Cl.[5] ............................................. G06F 7/50
[52] U.S. Cl. .................................................. 364/787
[58] Field of Search ......................................... 364/787

[56] References Cited

U.S. PATENT DOCUMENTS

| | | | |
|---|---|---|---|
| 3,372,377 | 3/1968 | Cohn et al. | 364/787 |
| 4,584,661 | 4/1988 | Grundland | 364/787 |
| 4,737,926 | 4/1988 | Vo et al. | 364/787 |
| 4,862,405 | 8/1989 | Benschneider et al. | 364/760 |
| 4,905,180 | 2/1990 | Kumar | 364/787 |
| 5,047,974 | 9/1991 | Young | 364/787 |
| 5,136,539 | 8/1992 | Kumar | 364/787 |

FOREIGN PATENT DOCUMENTS

| | | |
|---|---|---|
| 0164450 | 12/1985 | European Pat. Off. . |
| 450755A3 | 9/1991 | European Pat. Off. . |
| 1-50123 | 2/1989 | Japan . |

OTHER PUBLICATIONS

J. Delanue; "Cut Delay Times With Look-ahead Carry;" Electronic Design; pp. 74–77, vol. 19, No. 6 (1971).

Lynch, et al.; "A Spanning Tree Carry Lockahead Adder;" IEEE Trans. on Computers; pp. 931–939, vol. 41, No. 8, (1992).

Erdal, et al.; "Relaxed Pinout Constraints Yield Improved Parellel Adders For VLSI-Based Sys.;" IEEE; pp. 142–146 (1982).

Bradley J. Benschneider, et al., "A Pipelined 50-MHz CMOS 64-bit Floating Point Arithmetic Processor", IEEE Journal of Solid-State Circuits, vol. 24, No. 5, Oct. 1989, pp. 1317–1323.

Jesse T. Quatse, et al., "A Parallel Accumulator for a General-Purpose Computer", IEEE Transactions on Electronic Computers, vol. EC-14, No. 2, Apr. 1967, pp. 165–171.

*Primary Examiner*—David H. Malzahn
*Attorney, Agent, or Firm*—Paul J. Polansky

[57] ABSTRACT

A high-speed adder using a varied carry scheme, such as one of the carry-lookahead (CLA) type (30), includes a plurality of adder groups (32–37) each receiving some bits of two input operands. The adder groups are not identical but instead each adder group reduces a delay which is critical to its order. A least significant adder group (32) reduces a delay from operand input to carry output. A most-significant group (37) reduces a delay from carry input to sum output. Intermediate groups (33–36) reduce a delay from carry input to carry output.

22 Claims, 7 Drawing Sheets

HIGH SPEED ADDER USING A VARIED CARRY SCHEME AND RELATED METHOD

This application is a continuation of prior application Ser. No. 07/949,413, filed Sep. 22, 1992, now abandoned.

FIELD OF THE INVENTION

This invention relates generally to arithmetic circuits, and more particularly, to high-speed adder circuits and related methods.

BACKGROUND OF THE INVENTION

Adder circuitry is useful in various integrated circuits, especially in data processor-based integrated circuits. Several types of adder circuits are known in the art. A basic carry propagate adder (CPA) includes a number of identical full adder cells equal to the width of the adder. Full adder cells are well-known in the art and each full adder cell has an A operand input, a B operand input, a carry input, a sum output, and a carry output. The adder cells are ordered from least-significant to a most-significant. A carry output of each adder cell, except the most-significant adder cell, is provided to a carry input of a subsequent adder cell. In this way, the adder cells are chained together. The final sum is just a concatenation of each of the sum output bits. The worst-case speed of the basic CPA is the amount of time it takes for a carry, resulting from valid operand inputs to the least-significant adder cell, to propagate through the adder. Because the sum and carry outputs of any adder cell are not valid until a propagation delay after the carry input received from the previous adder cell is valid, the sum and carry outputs of the most-significant adder cell are not valid until a carry from the least-significant is propagated through all the adder cells.

In an effort to overcome the speed limitations of the basic CPA, designers have designed various alternative schemes. A carry-lookahead adder (CLA) groups the operand bits and simultaneously processes the carry out of the group with the sum outputs. This simultaneous processing allows an early decision of whether a carry is to be propagated to a subsequent adder group. Thus, addition in the subsequent adder groups may begin earlier. Known CLAs use identical adder groups, whose circuitry can be laid out easily.

A carry-save adder (CSA) has full adder cells corresponding to each operand bit position. However, the carry signals are not chained. Instead, the carry output from each cell is saved and provided to a subsequent adder stage for eventual inclusion in the final sum output and carry output, if any. Adders implemented in CSA stages are well-known in the art. For example, CSA stages are useful as part of a modified Booth's array in a modified Booth's multiplier.

SUMMARY OF THE INVENTION

Accordingly, there is provided, in one form, a high-speed adder using a varied carry scheme comprising a plurality of adder groups ordered from a least significant adder group to at least one intermediate adder group to a most-significant adder group. Each of the plurality of adder groups generates a plurality of sum signals in response to a predetermined number of corresponding bits of first and second operands. The predetermined number of the least-significant adder group is equal to the predetermined number of a least-significant intermediate adder group of the at least one intermediate adder group. The least-significant adder group has first and second inputs for receiving corresponding bits of the first and second operands, respectively, a first output for providing corresponding bits of a sum thereof, and a second output for providing a carry output signal thereof. Each intermediate adder group has first and second inputs for receiving corresponding bits of the first and second operands, respectively, a third input for receiving a carry output signal of a next less-significant group, a first output for providing corresponding bits of a sum thereof, and a second output for providing a carry output signal thereof. The most-significant adder group has first and second inputs for receiving corresponding bits of the first and second operands, respectively, a third input for receiving a carry output signal of a most-significant adder group of the at least one intermediate adder group, and an output for providing corresponding bits of a sum thereof. The least-significant adder group provides the carry output thereof a first delay after the corresponding bits of the first and second operands are valid. One of the at least one intermediate adder group provides the carry output thereof a second delay after the corresponding bits of the first and second operands are valid. The first delay is shorter than the second delay.

In another form, there is provided a method for reducing an overall propagation tinge required to add first and second operands together in an adder. Corresponding bits of the first and second operands are separated into ordered groups having equal numbers of bits. Each of the ordered groups are provided to inputs of corresponding adder groups of a plurality of adder groups ordered from a least-significant adder group to at least one intermediate adder group to a most-significant adder group. corresponding bits of the first and second operands are summed in each of the plurality of adder groups to provide corresponding sum outputs for each of the plurality of adder groups and a carry output for each of the plurality of adder groups except the most-significant adder group. The carry output of each adder group except the most-significant adder group is coupled to a carry input of a next more-significant adder group. The corresponding sum outputs of each adder group are concatenated to provide a sum output of the adder.

The carry output of the least-significant adder group is provided a first propagation delay from the corresponding bits of the first and second operands. The carry output of one of the at least one intermediate adder group is provided a second propagation delay from the corresponding bits of the first and second operands. The first propagation delay is shorter than the second propagation delay.

These and other features and advantages will be more clearly understood from the following detailed description taken in conjunction with the accompanying drawings.

DETAILED DESCRIPTION OF A PREFERRED EMBODIMENT

Figure 1:
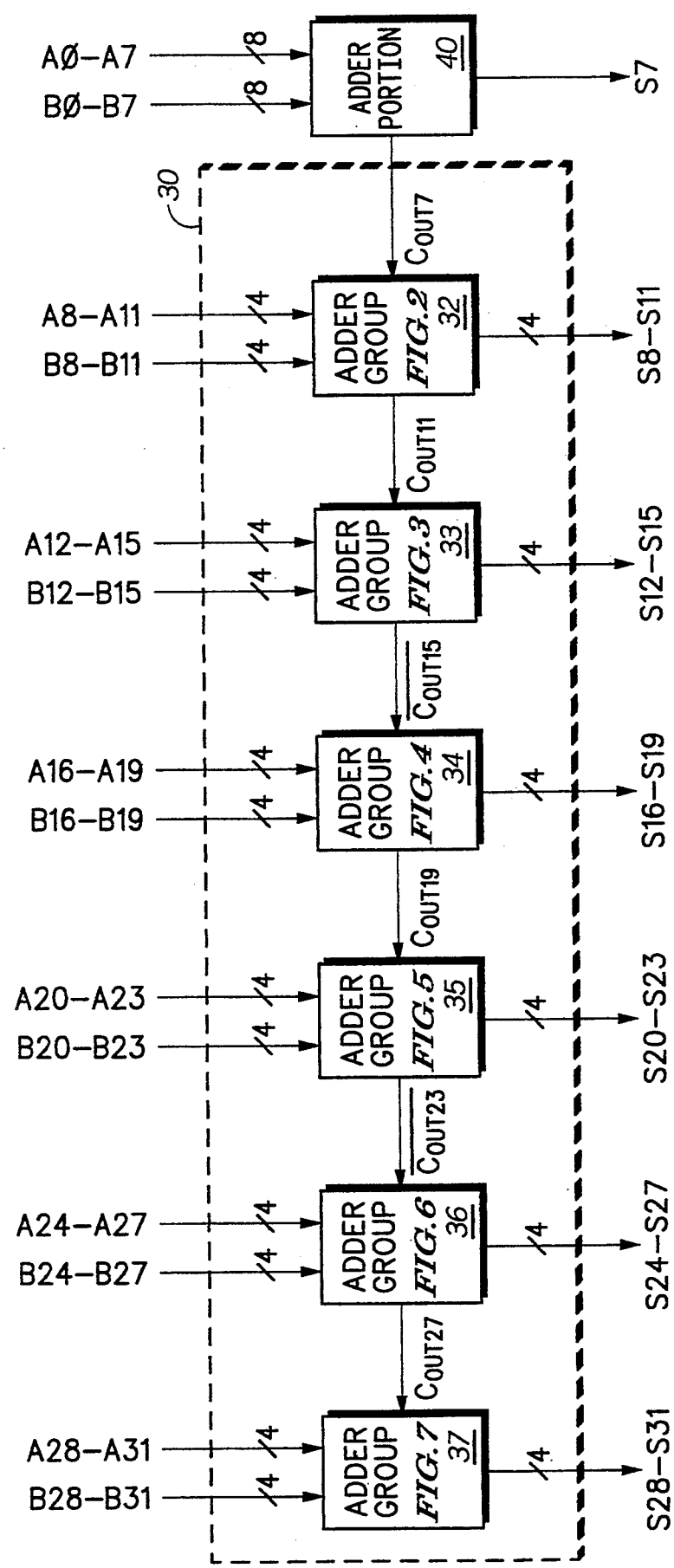
FIG. 1 illustrates in block diagram form an adder in accordance with the present invention.

FIG. 1 illustrates in block diagram form an adder 20 in accordance with the present invention. Adder 20 is a 32-bit carry-lookahead (CLA) adder implemented in a 0.8 micron complementary metal-oxide-semiconductor (CMOS) process. Adder 20 adds two 32-bit input operands (labelled "A0–A31" and B0–B31" respectively) and provides a sum output truncated to the twenty-five most significant bits labelled "S7–S31". Adder 20 includes generally a 24-bit adder 30 and an 8-bit adder portion 40. Adder portion 40 receives the eight least-significant eight bits of the two operands, A0–A7 and B0–B7, respectively. Adder portion 40 only generates sum bit S7 and a carry output from the seventh bit position, labelled "$C_{OUT7}$". In the illustrated embodiment, input signals A0–A7 and B0–B7 are received earlier than other remaining operand bits and thus any propagation delay through adder portion 40 is not critical to the speed of adder 20.

Adder 30 is a high-speed, 24-bit carry-lookahead adder (CLA). Adder 30 includes generally a first adder group 32, a second adder group 33, a third adder group 34, a fourth adder group 35, a fifth adder group 36, and a sixth adder group 37. Each of the six adder groups 32–37 receives four corresponding bits from each of the two operands, and provides four corresponding sum output signals and a carry output signal representing a carry from the most significant bit position of the group. Overall sum output S7–S31 is a concatenation of the sum outputs of each group in adder 30 and S7 from adder portion 40.

Adder group 32 is a least-significant adder group of adder 30 and receives signal $C_{OUT7}$ from adder portion 40 and operand bits A8–A11 and B8–B11. Adder group 32 provides corresponding four sum output bits S8–S11 and a carry out signal labelled "$C_{OUT11}$" to adder group 33. Adder group 33 receives signal $C_{OUT11}$ and subsequent operand bits A12–A15 and B12–B15, and provides corresponding sum output signals S12–S15 and a carry out signal labelled "$C_{OUT15}$" to adder group 34. Adder group 34 receives signal $C_{OUT15}$ and subsequent operand bits A16–A19 and B16–B19, and provides corresponding sum output signals S16–S19 and a carry out signal labelled "$C_{OUT19}$" to adder group 35. Adder group 35 receives signal $C_{OUT19}$ and subsequent operand bits A20–A23 and B20–B23, and provides corresponding sum output signals S20–S23 and a carry out signal labelled "$C_{OUT23}$" to adder group 36. Adder group 36 receives signal $C_{OUT23}$ and subsequent operand bits A24–A27 and B24–B27, and provides corresponding sum output signals S24–S27 and a carry out signal labelled "$C_{OUT27}$" to adder group 37. Adder group 37 is a most-significant adder group of adder 30 and receives signal $C_{OUT27}$ and subsequent operand bits A28–A31 and B28–B31, and provides corresponding sum output signals S28–S31. The sign of the carry output signal is reversed between adder groups (except for group 32 which is special) in order to reduce one level of logic between each of the groups.

Adder 30 differs from known CLAs in that adder groups 32–37 are not all identical. Rather, adder groups 32–37 take advantage of the group's order (significance) by reducing a delay through logic circuitry critical to that adder group. The overall propagation delay through adder 30 can be defined as the longest amount of time it takes for a valid input to result in a valid output. In the worst case, a carry ($C_{OUT7}$) is received from adder portion 40 and propagates through each adder group before affecting the value of sum signals S28–S31.

In general, adder 30 implements three different priority schemes. For least-significant adder group 32, it is most important to reduce the delay from a valid operand (or carry) input to a valid carry output. Thus, the logic and circuit design of adder group 32 reduces this delay. The delay in providing the sum output is not critical because the sum output only needs to be valid before the carry has propagated through all groups. Thus, adder group 32 sacrifices speed in providing sum output signals S8–S11 in order to improve the propagation time from the operand and carry inputs to the carry output, $C_{OUT11}$.

For intermediate adder groups 33–36, it is necessary to propagate the carry input through to the carry output quickly, or alternatively, to reduce the delay from $C_{OUT11}$ to $C_{OUT27}$. On the other hand, the operand inputs have sufficient time to become valid before the received carry input is valid. Thus, the intermediate adder groups reduce the delay path from carry input to carry output, even at the sacrifice of additional delay in the other paths. More-significant groups 35 and 36 must also provide their respective sum outputs quickly in response to the carry input because most significant group 37 is able to provide its outputs shortly after the carry input.

For most-significant adder group 37, the operand inputs have the maximum setup time before the carry input is valid. However, the speed with which adder group 37 provides its sum output after a valid carry input is critical to the overall propagation delay of adder 30. Thus, the logic and circuit design of adder 37 reduces the delay path from a valid carry input to a valid sum output.

TABLE I illustrates the number of gate delays associated with the different groups in adder 30. The number counts both transmission gates and complex gates as providing one gate delay. The critical signal path is denoted by an asterisk (*).

TABLE I

| Adder group | A/B to $C_{OUT}$ | $C_{IN}$ to $C_{OUT}$ | $C_{IN}$ to $S_{OUT}$ | A/B to $S_{OUT}$ |
|---|---|---|---|---|
| 32 | 4* | 4* | 5 | 5 |
| 33 | 5 | 1* | 5 | 5 |
| 34 | 6 | 1* | 4 | 5 |
| 35 | 6 | 1* | 4 | 7 |
| 36 | 5 | 1* | 4 | 7 |
| 37 | N/A | N/A | 3* | 7 |

It should be noted that the optimum number of operand bits in each group depends on the size of the operand, the technology used, and the characteristics of logic gates using that technology such as fanout, etc. However, the decision of which delay to reduce depends on the foregoing rules. A slight modification occurs if it is desired to provide a carry out from group 37 to be valid when $S_{OUT}$ is valid; in that case, both the $C_{IN}$ to $C_{OUT}$ and $C_{IN}$ to $S_{OUT}$ delays must be reduced.

The delay through each adder group's critical path is reduced by realizing the appropriate logic function using the minimum number of logic levels which can be practically realized using logic gates available in the technology. In the illustrated embodiment, adder 30 uses 0.8 micron CMOS technology. Thus, for example, the minimum practical propagation time from A8–A11 and B8–B11 to $C_{OUT11}$ requires four gate delays. This practical minimum number of gate delays should be distinguished from the theoretical minimum number of gate delays (two) to implement any logic function if the logic gates had unlimited numbers of inputs and outputs.

Figure 2:
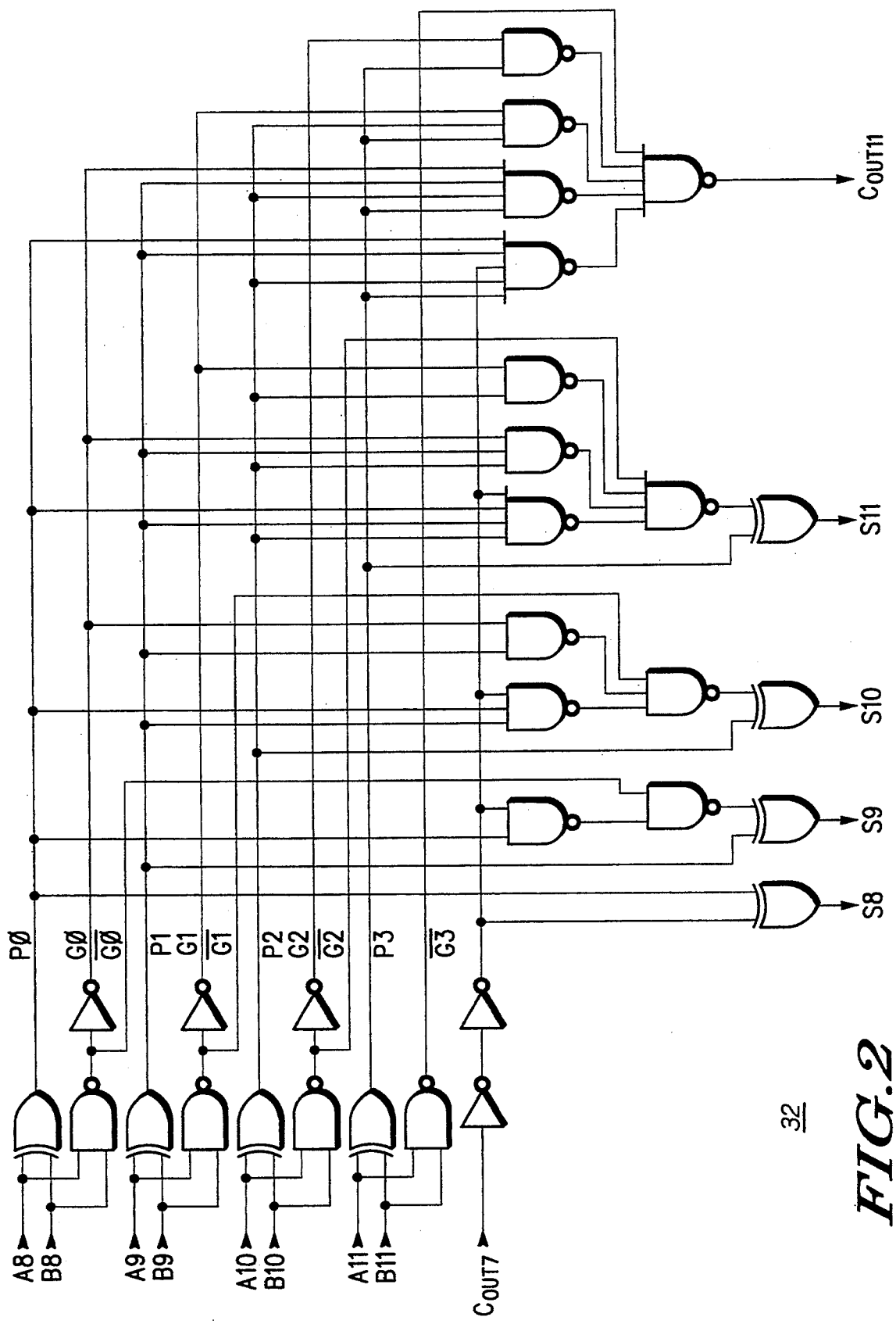
FIGS. 2–7 illustrate in logic diagram form respective adder groups of FIG. 1.

FIGS. 2–7 illustrate in logic diagram form respective adder groups 32–37 of FIG. 1. FIG. 2 illustrates in schematic form adder group 32 of FIG. 1. Adder group 32 receives operand input bits A8–A11 and B8–B11, carry input signal $C_{OUT7}$, and provides corresponding sum output signals S8–S11 and carry output signal $C_{OUT11}$. Each A bit is provided as an input to an exclusive-OR gate along with its corresponding B bit. The output of the exclusive OR gate is labelled "Pj", where j is equal to the bit position within the adder group. In addition, each A bit is provided as an input to an NAND gate along with its corresponding B bit. The output of the NAND gate is labelled "$\overline{Gj}$". Each signal $\overline{Gj}$ (except for G3) is provided to an inverter, the output of which is labelled "Gj". Signals Pj, Gj, and CI (twice inverted for buffering) are then combined in two levels of NAND gates to provide signal $C_{OUT11}$. The worst-case propagation delay from either A8–A11/B8–B11 to $C_{OUT11}$, or from $C_{OUT7}$ to $C_{OUT11}$, is thus four logic levels, which is the minimum number of logic levels using standard 0.8 micron CMOS logic gates. In the illustrated embodiment of adder 20, adder portion 40 provides signal $C_{OUT7}$ with adequate setup time to allow it to be buffered. In other embodiments in which the timing of signal $C_{OUT7}$ is critical, the buffering may be eliminated.

Figure 3:
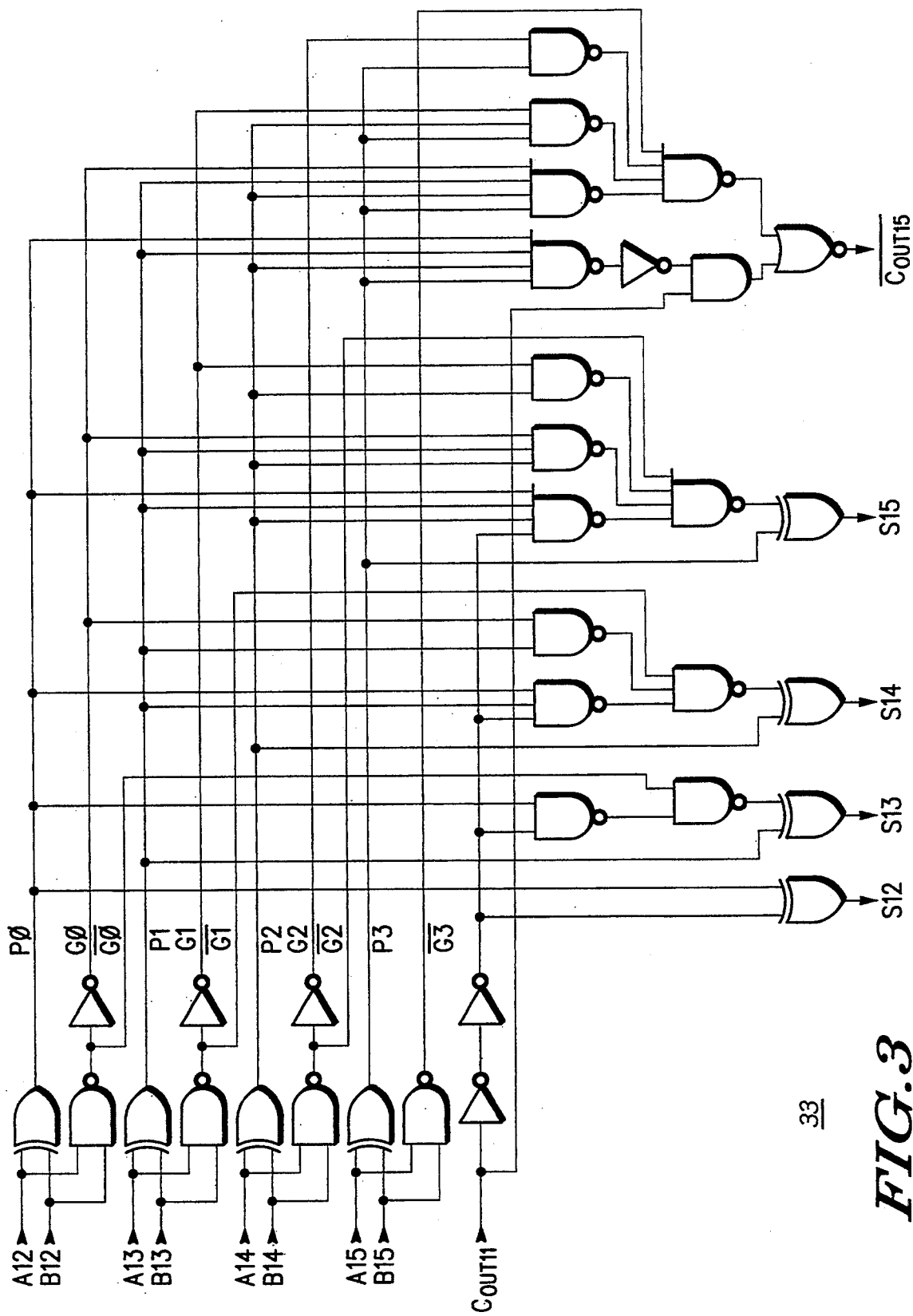

FIG. 3 illustrates in schematic form adder group 33 of FIG. 1. Input, output, and internal signals are designated similarly as corresponding signals in adder group 32 of FIG. 2. Carry output signal $C_{OUT15}$ is provided using negative logic, however. In addition, the delay from $C_{OUT11}$ to $C_{OUT15}$ is now critical, and is implemented using a complex CMOS AND-NOR gate.

Figure 4:
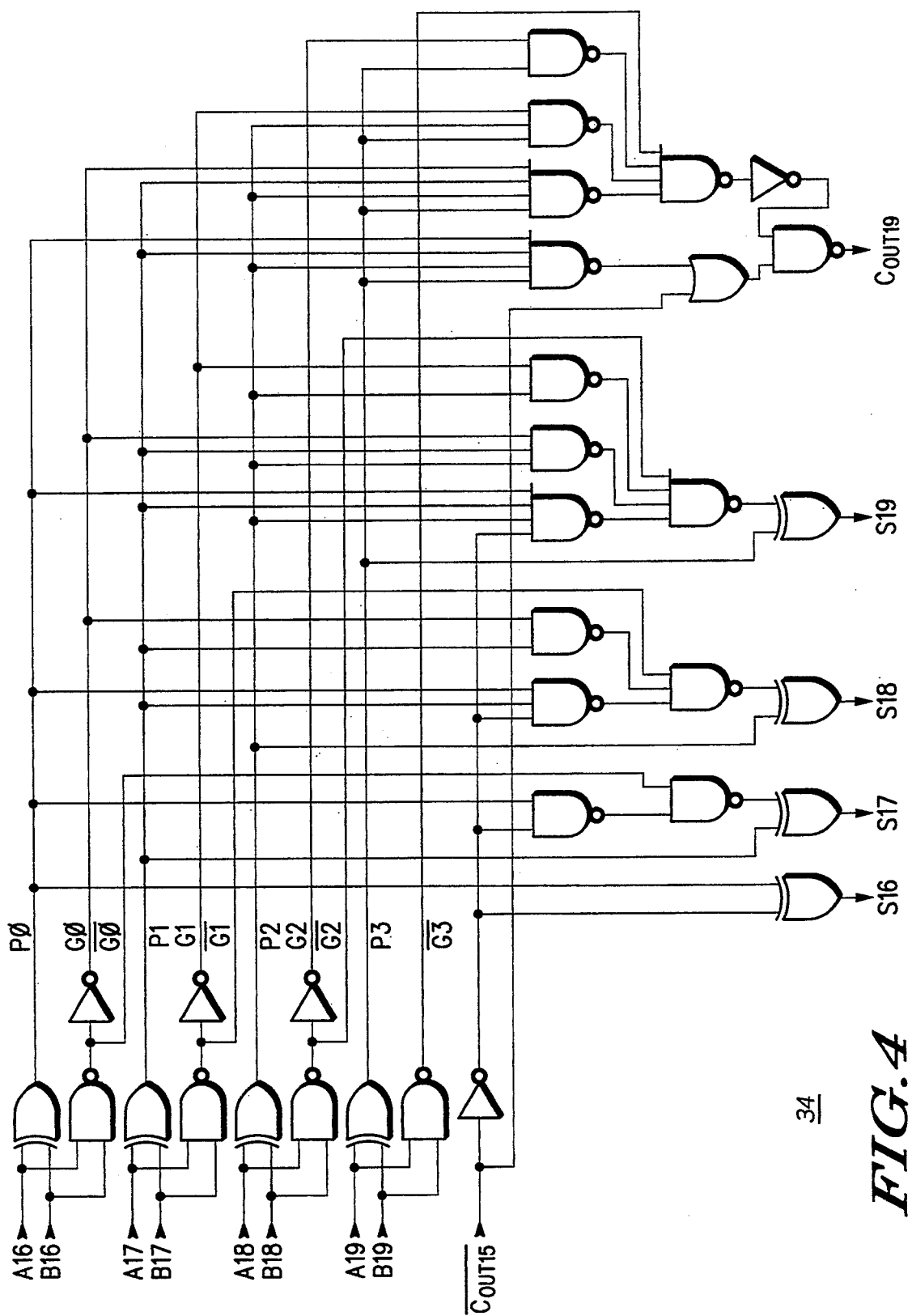

FIG. 4 illustrates in schematic form adder group 34 of FIG. 1. Adder group receives negative logic carry input $C_{OUT15}$, and provides positive-logic signal $C_{OUT19}$. Signal $C_{OUT15}$ propagates through only one complex CMOS OR-NAND gate, which is the equivalent of the AND-NOR gate of adder group 33 for negative logic.

Figure 5:
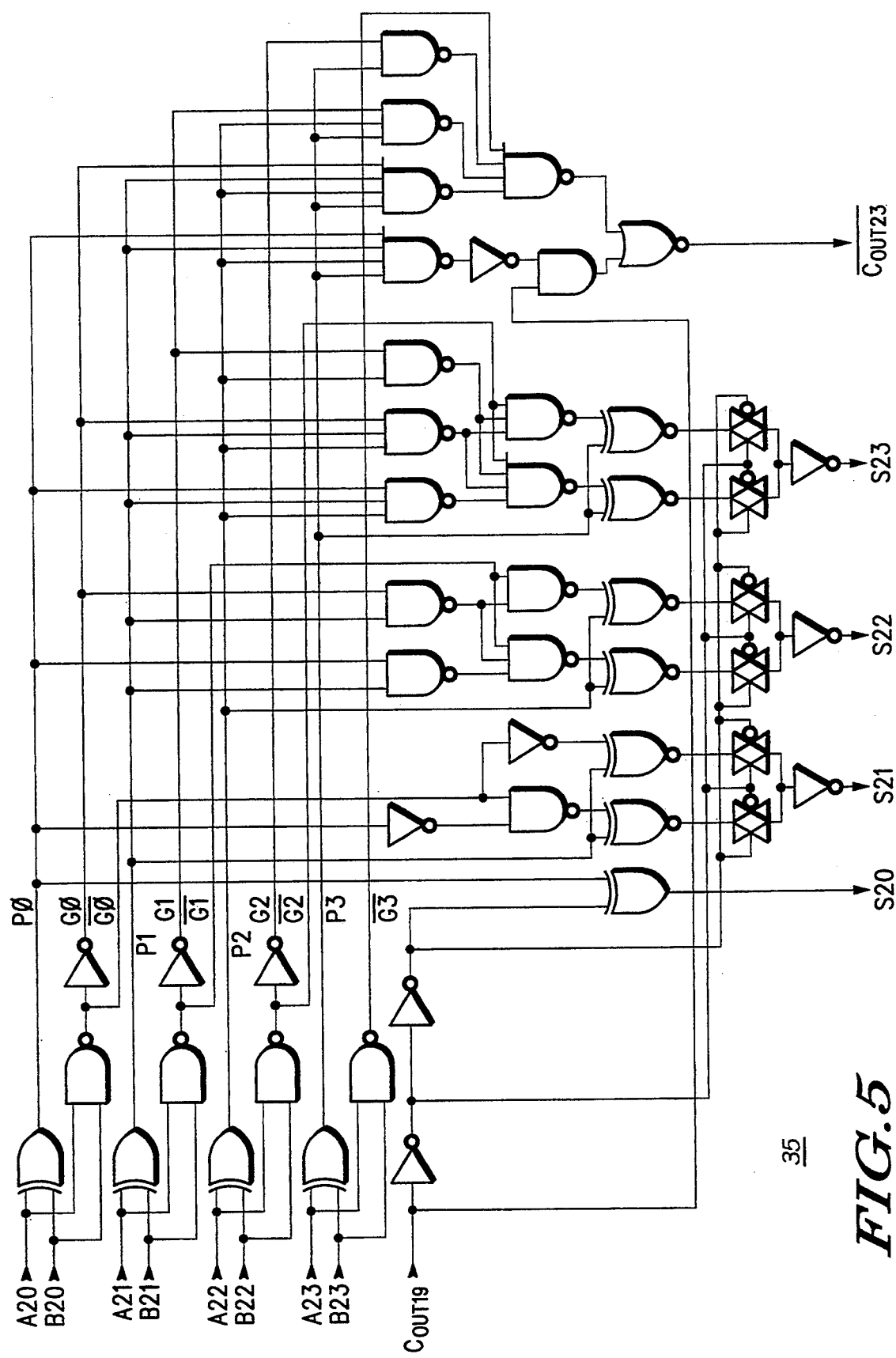

FIG. 5 illustrates in schematic form adder group 35 of FIG. 1. Adder group 35 is similar to adder group 33 because adder group 35 propagates signal $C_{OUT19}$ through a complex AND-NOR gate to provide signal $C_{OUT23}$. However, since group 35 is closer to most-significant adder group 37, it is necessary to propagate sum signals S20–S23 more quickly after $C_{OUT19}$ is valid. Thus, carry input signal $C_{OUT19}$ and its complement, formed by buffering $C_{OUT19}$ through one and two inverter levels, make CMOS transmission gates conductive to propagate sum signals S20–S23 after only an additional inverter delay.

Figure 6:
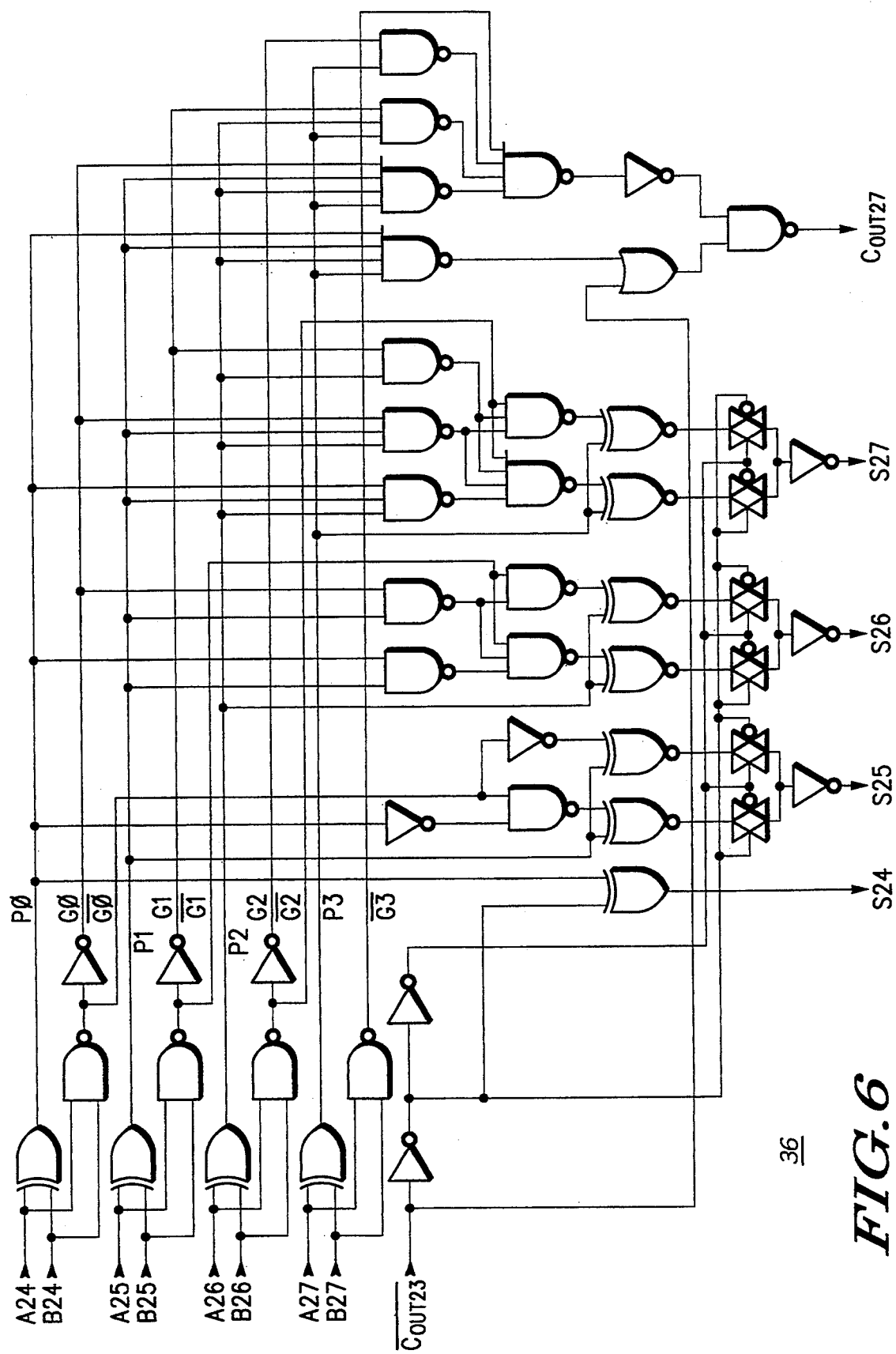

FIG. 6 illustrates in schematic form adder group 36 of FIG. 1. Adder group 36 is similar to adder group 34 because adder group 36 propagates $C_{OUT23}$ through a complex OR-NAND gate to provide signal $C_{OUT27}$. Furthermore, since adder group 36, like adder group 35, is close to most-significant adder group 37, it is necessary to propagate sum signals S24–S27 more quickly after $C_{OUT23}$ is valid. Thus, carry input signal $C_{OUT23}$ and its complement, formed by buffering $C_{OUT23}$ through one and two inverter levels, make CMOS transmission gates conductive to propagate sum signals S24–S27 after only an additional inverter delay.

Figure 7:
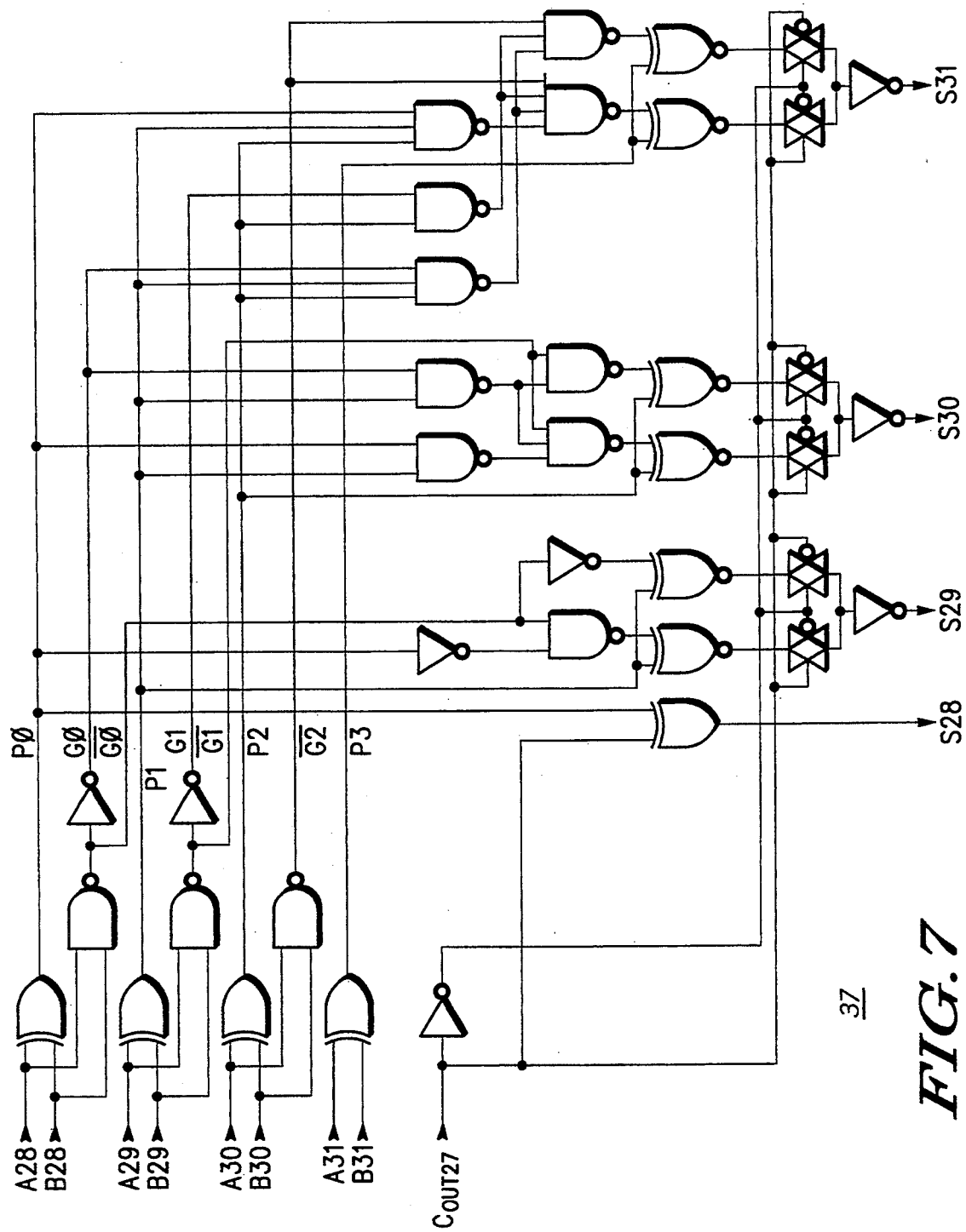

FIG. 7 illustrates in schematic form adder group 37 of FIG. 1. Adder group 37 must provide sum signals S28–S31 as quickly as possible after carry input signal $C_{OUT27}$ is valid. Thus, $C_{OUT27}$ and its complement activate CMOS transmission gates to provide sum output signals S28–S31 after only an additional inverter delay.

Referring again to FIG. 1 in conjunction with TABLE I, it should be clear that adder 30 decreases the overall propagation delay from an adder with uniform or identical adder group design. For example, if adder group 32 were repeated, then the overall propagation delay would increase by approximately 14 gate delays. In many applications, adder speed is critical and this improvement in adder speed improves overall integrated circuit performance.

While the invention has been described in the context of a preferred embodiment, it will be apparent to those skilled in the art that the present invention may be modified in numerous ways and may assume many embodiments other than that specifically set out and described above. For example, the priority scheme of adder groups 32–37 in 24-bit adder 30 may be applied to adders of different sizes. One obvious extension would be to form a 32-bit adder. In such an adder, the least-significant group reduces the delay from valid operand inputs to valid carry output. Intermediate groups would reduce the delay from carry input to carry output. The most-significant group would reduce the delay from carry input to sum output. If adder 30 were implemented using a different technology, then the number of bits processed by each group, logic gate fanout, and availability of complex logic gates may change, but the relative priority will remain the same. Accordingly, it is intended by the appended claims to cover all modifications of the invention which fall within the true spirit and scope of the invention.

I claim:

1. A high-speed adder using a varied carry scheme comprising:

a plurality of adder groups ordered from a least-significant adder group to at least one intermediate adder group to a most-significant adder group, each of said plurality of adder groups generating a plurality of sum signals in response to a predetermined number of corresponding bits of first and second operands;

said predetermined number of said least-significant adder group being equal to said predetermined number of a least-significant intermediate adder group of said at least one intermediate adder group;

said least-significant adder group having first and second inputs for receiving corresponding bits of said first and second operands, respectively, a first output for providing corresponding bits of a sum thereof, and a second output for providing a carry output signal thereof;

each intermediate adder group having first and second inputs for receiving corresponding bits of said first and second operands, respectively, a carry input for receiving a carry output signal of a next less-significant group, a first output for providing corresponding bits of a sum thereof, and a second output for providing a carry output signal thereof; and said most-significant adder group having first and second inputs for receiving corresponding bits of said first and second operands, respectively, a carry input for receiving a carry output signal of a most-significant intermediate adder group of said at least one intermediate adder group, and an output for providing corresponding bits of a sum thereof;

said least-significant adder group providing said carry output signal thereof a first delay after said corresponding bits of said first and second operands are valid;

one of said at least one intermediate adder group providing said carry output signal thereof a second delay after said corresponding bits of said first and second operands are valid, said first delay being shorter than said second delay.

2. The adder of claim 1 wherein said first delay is equal to a first predetermined number of gate delays, and wherein said second delay is equal to a second predetermined number of gate delays.

3. The adder of claim 2 wherein said first predetermined number of gate delays is equal to four gate delays.

4. The adder of claim 1 wherein said predetermined number of said most-significant adder group is equal to said predetermined number of said most-significant intermediate adder group of said at least one intermediate adder group, wherein said most significant adder group provides said sum thereof a third delay after said carry input is valid, and wherein said most-significant intermediate adder group of said at least one intermediate adder group provides said sum thereof a fourth delay after said carry input thereof is valid, said third delay being shorter than said fourth delay.

5. The adder of claim 4 wherein said third delay is equal to a third predetermined number of gate delays, and wherein said fourth delay is equal to a fourth predetermined number of gate delays.

6. The adder of claim 5 wherein said third predetermined number of gate delays is equal to three gate delays.

7. The adder of claim I wherein said least-significant adder group further receives a carry input signal, and provides said carry output signal thereof a fifth delay after said carry input signal thereof is valid, said fifth delay shorter than said second delay.

8. The adder of claim 7 wherein said fifth delay is equal to a fifth predetermined number of gate delays.

9. The adder of claim 8 wherein said fifth predetermined number of gate delays is equal to four gate delays.

10. The adder of claim 7 wherein said fifth delay is equal to said first delay.

11. A high-speed adder using a varied carry scheme comprising:

a plurality of adder groups ordered from a least significant adder group to at least one intermediate adder group to a most-significant adder group, each of said plurality of adder groups generating a plurality of sum signals in response to a predetermined number of corresponding bits of first and second operands;

said predetermined number of said most-significant adder group being equal to said predetermined number of a most-significant intermediate adder group of said at least one intermediate adder group;

said least-significant adder group having first and second inputs for receiving corresponding bits of said first and second operands, respectively, a first output for providing corresponding bits of a sum thereof, and a second output for providing a carry output signal thereof;

each intermediate adder group having first and second inputs for receiving corresponding bits of said first and second operands, respectively, a carry input for receiving a carry, output signal of a next less-significant group, a first output for providing corresponding bits of a sum thereof, and a second output for providing a carry output signal thereof; and said most-significant adder group having first and second inputs for receiving corresponding bits of said first and second operands, respectively, a carry input for receiving a carry output signal of said most-significant intermediate adder group of said at least one intermediate adder group, and an output for providing corresponding bits of a sum thereof;

said most-significant adder group providing said sum thereof a first delay after said carry input is valid;

said most-significant intermediate adder group of said at least one intermediate adder group providing said sum thereof a second delay after said carry input is valid, said second delay being greater than said first delay.

12. The adder of claim 11 wherein said first delay is equal to a first predetermined number of gate delays, and wherein said second delay is equal to a second predetermined number of gate delays.

13. The adder of claim 12 wherein said first predetermined number of gate delays is equal to three gate delays.

14. A method for reducing an overall propagation time required to add first and second operands together in an adder, comprising the steps of:

separating corresponding bits of the first and second operands into ordered groups having equal numbers of bits;

providing each of said ordered groups to inputs of corresponding adder groups of a plurality of adder groups ordered from a least-significant adder group to at least one intermediate adder group to a most-significant adder group;

summing corresponding bits of the first and second operands in each of said plurality of adder groups to provide corresponding sum outputs for each of said plurality of adder groups and a carry output for each of said plurality of adder groups except said most-significant adder group;

coupling said carry output of each adder group except said most-significant adder group to a carry input of a next more-significant adder group;

concatenating said corresponding sum outputs of each adder group to provide a sum output of the adder;

providing said carry output of said least-significant adder group a first propagation delay from said corresponding bits of the first and second operands; and providing said carry output of one of said at least one intermediate adder group a second propagation delay from said corresponding bits of the first and second operands, said first propagation delay being shorter than said second propagation delay.

15. The method of claim 14 further comprising the steps of:

providing said sum output of a second one of said at least one intermediate adder group a third propagation delay from said carry input thereof; and providing said sum output of said most-significant adder group a fourth propagation delay from said carry input thereof, said fourth propagation delay being shorter than said third propagation delay.

16. The method of claim 14 further comprising the steps of:

providing said carry output of a second one of said at least one intermediate adder group a third propagation delay from said carry input thereof; and providing said carry output of said least-significant adder group a fourth propagation delay from said carry input thereof, said third propagation delay being shorter than said fourth propagation delay.

17. The method of claim 14 further comprising the steps of:

providing a carry input to said least-significant adder group; and providing said carry output of said least-significant adder group a third propagation delay after said carry input thereof, said third propagation delay equal to said first propagation delay.

18. A method for reducing an overall propagation time required to add first and second operands together in an adder, comprising the steps of:

separating corresponding bits of the first and second operands into ordered groups having equal numbers of bits;

providing each of said ordered groups to inputs of corresponding adder groups of a plurality of adder groups ordered from a least-significant adder group to at least one intermediate adder group to a most-significant adder group;

summing corresponding bits of the first and second operands in each of said plurality of adder groups to provide corresponding sum outputs for each of said plurality of adder groups and a carry output for each of said plurality of adder groups except said most-significant adder group;

coupling said carry output of each adder group except said most-significant adder group to a carry input of a next more-significant adder group;

concatenating said corresponding sum outputs of each adder group to provide a sum output of the adder;

providing said sum output of one of said at least one intermediate adder group a first propagation delay from said carry input thereof; and providing said sum output of said most-significant adder group a second propagation delay from said carry input thereof, said first propagation delay being longer than said second propagation delay.

19. A high-speed adder using a varied carry scheme comprising:

a plurality of adder groups, ordered from a most-significant adder group to a least-significant adder group, each receiving a like number of corresponding bits of first and second operands, providing said like number of corresponding bits of a sum of said first and second operands, and providing a carry output signal;

each of said plurality of adder groups including carry lookahead circuitry for generating a carry output signal responsive to a carry input signal and to said like number of corresponding bits of said first and second operands, wherein said carry lookahead circuitry operates at level zero carry lookahead;

said carry lookahead circuitry of said least-significant adder group providing said carry output signal a first delay after said like number of corresponding bits of said first and second operands are valid;

said carry lookahead circuitry of a second least significant adder group providing said carry output signal a second delay after said like number of corresponding bits of said first and second operands are valid;

said first delay being shorter than said second delay.

20. The adder of claim 19, wherein said like number of each of said plurality of adder groups is equal to four.

21. A high-speed adder using a varied carry scheme comprising:

a plurality of adder groups, ordered from a most-significant adder group to a least-significant adder group, each receiving a like number of corresponding bits of first and second operands, providing said like number of corresponding bits of a sum of said first and second operands, and providing a carry output signal;

each of said plurality of adder groups including carry lookahead circuitry for generating a carry output signal responsive to a carry input signal and to said like number of corresponding bits of said first and second operands, wherein said carry lookahead circuitry operates at level zero carry lookahead;

said carry lookahead circuitry of said most-significant adder group providing said like number of corresponding bits of said sum output a first delay after said carry input is valid;

said carry lookahead circuitry of a second most-significant adder group providing said like number of corresponding bits of said sum output a second delay after said carry input is valid;

said first delay being shorter than said second delay.

22. The adder of claim 21, wherein said like number of each of said plurality of adder groups is equal to four.

* * * * *